Oct. 13, 1953 H. WELKER 2,655,624

MULTIELECTRODE SEMICONDUCTOR CRYSTAL ELEMENT

Filed Jan. 18, 1951 2 Sheets-Sheet 1

HEINRICH WELKER
INVENTOR

Theodore Hafner
ATTORNEY

HEINRICH WELKER
INVENTOR
Theodore Hafner
ATTORNEY

Patented Oct. 13, 1953

2,655,624

UNITED STATES PATENT OFFICE 2,655,624

MULTIELECTRODE SEMICONDUCTOR CRYSTAL ELEMENT

Heinrich Welker, Vaucresson, France, assignor to Societe Anonyme dite: Compagnie des Freins & Signaux Westinghouse, Paris, France Application January 18, 1951, Serial No. 206,536
In France June 28, 1950

15 Claims. (Cl. 317—235)

In the construction of semi-conductor crystal amplifiers, it is often required to use semi-conductor crystal elements in the form of a thin strip (the thickness being in the order of from 1 to 500 microns) provided with surface electrodes on the end faces of the strip so that the current may flow longitudinally through it.

The length and transverse dimensions of the strip are also subject to certain limiting factors; such factors may includes, e. g. the approximate value of the electrical resistance of the assembly as a whole, and/or the barrier layer properties of the semi-conductor crystal element or the "electron-hole" re-combination effect therein. These factors may impose a maximum limiting value for the said length and transverse dimensions equal, say to 2 mm.; however, these dimensions practically always represent values 10 to 100 times greater than the thickness dimension.

It would appear simple enough to produce such a thin striplike crystal element by vaporizing or spraying the semi-conductor material upon the respective electrodes. And indeed, with germanium and silicon, at present the most frequently used semi-conductor substances, it is practically possible to follow such a procedure, but the electrical characteristics of the coating thus produced differ considerably from those of a crystalline mass obtained by melting, in that the requisite barrier layer effects may only inadequately, if at all, be obtained therein.

Another difficulty displayed by the problem consists in the fact that the electrodes should be so applied as partially to form a barrier layer with the crystal and partially without the formation of a barrier layer. Consequently, by using a crystal having uniform properties, which actually occurs nearly always, the various parts of the crystal surface should be subjected to different surface treatments depending on whether the electrode should be applied with or without a barrier layer. It is evident that the technical solution of such problems is exceedingly difficult owing to the minute dimensions of the crystal.

The present invention provides the combination of two metal electrodes practically free of barrier layer effect, on a semi-conductor crystal element capable of displaying the barrier layer effect at all points of its surface, and this object is attained by imparting certain specific geometric forms to the semi-conductor crystal element.

More specifically, the invention provides a semiconductor crystal element in the form of a cylindrical body in which the cross-sectional contour normal to the generatrices includes at least one central concave portion defining with the opposite side of said contour a restriction of from about 1 micron to 500 microns thick, and outwardly flared enlarged portions to either side of said central restriction, and surface electrodes coating end areas of said enlarged portions. On the side of the contour opposite said concave portion and over the area corresponding with said restriction, one or more further electrodes may be provided.

In a preferred form of embodiment of the invention, the crystalline semi-conductor is similar in shape to a plano-concave cylindrical lens, the cross-section of the concave portion being a part of a circumference.

In the modification, the face opposite the concave portion is cut substantially to a bevel at an angle with respect to the transverse axis of the element.

The invention also contemplates a method of producing the aforementioned crystalline semiconductor, this method consisting of moulding the semi-conductor in an appropriate mould including within it a core-rod and, after mould-stripping, securing the semi-conductor to a supporting rod to subject the said semi-conductor to a grinding step on its face opposite to the concave portion in order to bring the thinnest portion of the semi-conductor down to the requisite thickness.

In the accompanying drawing, several forms of embodiment of the invention have been illustrated diagrammatically and only by way of example.

First referring to Figure 1, the mathematical and physical advantages of the form of semiconductor crystal element according to the invention will first be explained in the specific construction wherein one side of the element 1 includes a part-circular concave portion 2 while the opposite side 3 is provided planar.

Figure 1:
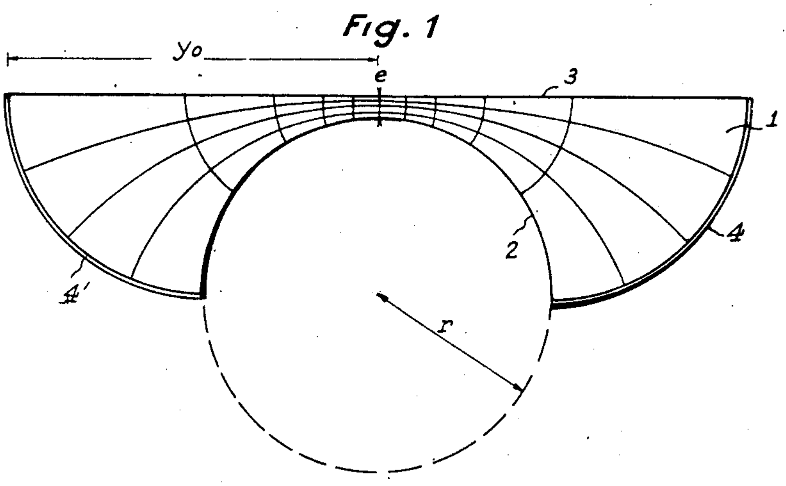
Figure 1 is a transverse cross section of a crystalline semi-conductor according to the invention, on a greatly enlarged scale.

Figure 1 represents the distribution of the lines of flow of electric current and the equipotential lines in such a crystal, in the case where electrodes 4 and 4' are arranged on both end faces. These end surfaces are circular arcs which intersect normally both the planar rear surface 3 and the concave front surface portion 2 of the element 1. In this case, the electrical resistance of the device may be expressed by the formula:

$$R=\frac{1}{b}\frac{2r+e}{\theta e}\tan^{-1}\left(\frac{y_0}{\sqrt{e(2r+e)}}\right)$$

Wherein $R$=Resistance in ohms;
$e$=Thickness of the cylindrical lens at its thinnest point;
$r$=Radius of the circular cylinder 2;
$y_0$=Distance from the centre axis of the system to the electrodes 4 and 4' assumed to be symmetrical;
$b$=Length of the element in a direction perpendicular to the plane of the figure; and
$\theta$=Conductivity of the semi-conductor.

In the case where the crystal is sufficiently thin ($e \ll r$) and where moreover $y_0$ approximately equals $r$, $y_0 \approx r$, there is obtained $$R=\frac{\pi}{b}\sqrt{\frac{e+2r}{e}}$$

in other words, R becomes independent from the exact position $y_0$ of the two electrodes with respect to the axis of symmetry, as has been confirmed by accurate measurements. Because of the large surface area of the electrodes (in the order of $r\times b$), the resulting effect, if any, produced externally of the device by the boundary layer, is only negligibly low.

It is not essential for the proper operation of the device that the front faces of the massive semi-conductor be circular as shown in Figure 1. They may just as well have the shape illustrated in Figure 2 or any other shape; it is important only that the distance $y_0$ from the electrodes to the axis extending through the thinnest portion of the crystal be greater than $\sqrt{e(2r+e)}$. When this condition is satisfied, the lines of current flow assume an unaltered circular form at a point already very close to the rear of the electrodes, as shown.

It should therefore be understood that, according to the invention, the concave side of the element does not necessarily show an accurately circular cross-section. The only critical factor is that the thickness of the element should increase at a faster than linear rate towards either side away from the centre axis. Otherwise, the value of electric resistance will not admit of an ultimate value as the distance from the centre axis to the electrode is increased. A parabolic cylindrical concave portion will therefore be equally capable of fulfilling the conditions both from the mathematical and the physical standpoint. Such a shape however is less desirable from the technical point of view because it obviously involves greater difficulty in execution.

The afore-mentioned formulae for calculating the resistance remain fully valid for such, more generic, cases. It is only necessary, in the formula, to replace the radius of the circular section by the radius of curvature of the surface at the thinnest point of the crystal.

Figure 3:
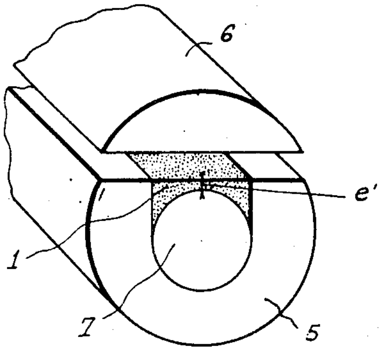
Figure 3 is a perspective view of the mould which may be used in obtaining the crystalline semi-conductor of Figure 2.

The shape of the cylindrical element, made e. g. of germanium, including in cross-section, a concave portion according to the invention, is easy to obtain by means of apparatus such as that illustrated in Figure 3. The germanium is moulded in a graphite mould, divided in two parts 5 and 6. A core rod 7, e. g. round, easy to produce with the requisite precision on a lathe, serves as a core for the concave portion of the element. To make allowance for the properties of the moulding and because of the brittleness of germanium, it is preferable initially to make the distance $e'$ (Figure 3) greater than that contemplated for the final thickness $e$.

After moulding the semi-conductor crystal is withdrawn from the mould, the core-rod 7 is removed and, by means of an insulating binder (glass powder, synthetic resin, or the like), the cleaned crystal is secured on an insulating support 8 in the shape of a cylindrical rod equal in diameter to the initial core.

Figures 4, 5:
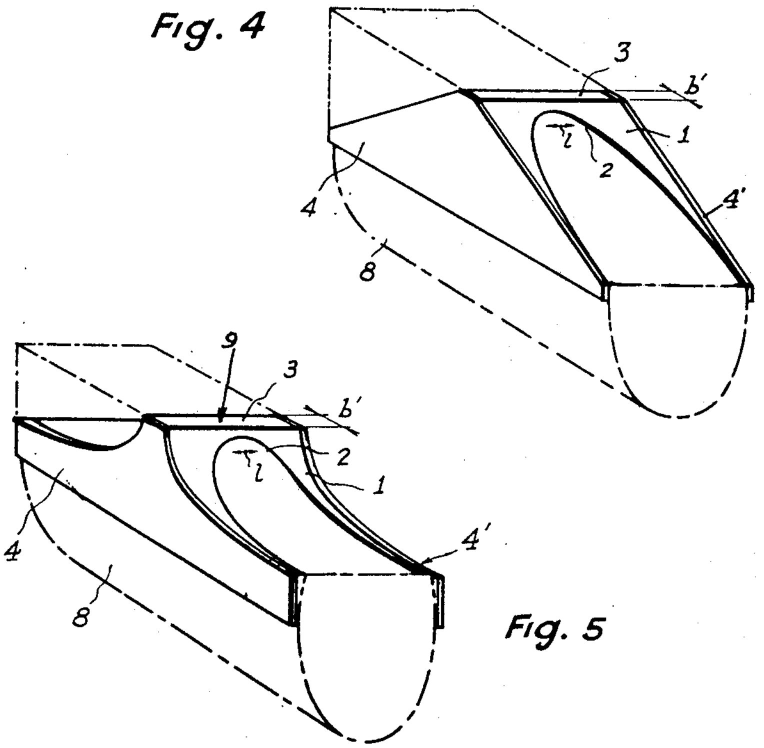
Figure 4 is a perspective view of another form of embodiment of the invention mounted on a support.
Figure 5 shows a modification of Figure 4.

The flat side of the crystal is then ground down to the desired thickness. The electrodes 4 and 4' of the end faces may be mounted or applied before or after grinding in a manner known per se, for instance by vaporization, electrolysis, spraying, etc. . . ., of a good conductor metal such as iron, copper, aluminum, silver, gold, platinum, etc. . . . The flat surface of the crystal may be subjected to a surface treatment in known manner before the subsequently-provided electrodes, e. g. the control electrodes, one of which 9 has been diagrammatically shown as a solid line in Fig. 5, have been assembled or applied to it. Said electrode or electrodes (which may be either point-electrodes or surface-electrodes) are desirably applied in the electrically effective area of the thinnest portion of the element, the length of this area being approximately $1=2\sqrt{e(2r+e)}$.

The cylindrical crystal element thus produced, having the thickness $e$ in its thinnest part and an approximate length $2r$, behaves electrically exactly like a crystal much smaller in size, but much more difficult to handle, having a rectangular section with a thickness $e$ and a length $1=2\sqrt{e(2r+e)}$.

Figure 2:
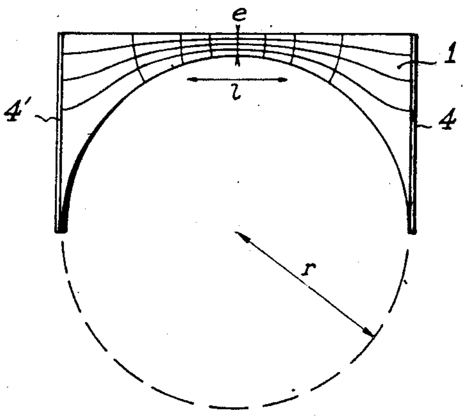
Figure 2 is a section similar to Figure 1, but relates to a modified embodiment.

These conditions are illustrated in Figure 2 in which, for a crystal having the thickness $e=50\mu$, the effective electric length 1=1 mm.

The semi-conductive crystal element of the invention brings a considerable progress in the art. With the electrical characteristics of the device retained equal to those of a crystal rectangular in section having a thickness $e$ and a length $1=2\sqrt{e(2r+e)}$, the crystal of the invention is substantially larger while at the same time the production difficulties have ground smaller.

The desired dimensions as favourable from the electric standpoint are obtained by determining the radius of the core-rod 7 according to the formula $$r=\frac{1^2}{8e}-\frac{e}{2}$$

If great precision is desired in the lateral or width dimension of the crystal element (i. e. the dimension measured perpendicularly to the plane of the drawing in either Figure 1 or Figure 2), then, instead of merely sawing off the element on two spaced planes normal to said dimension, the crystal on its supporting rod may be ground to a double bevel angle so as to leave only a narrow transverse strip across the longitudinally-intermediate area of the crystal. The bevels may be planar (as in Figure 4) or arcuate (as in Figure 5).

This makes it possible to obtain, also in the lateral direction, excessively restricted semi-conductor channels (width=$b'$) for example, if it is desired to obtain a high over-all resistance for the device. One considerable advantage of this last-mentioned procedure lies in the fact that the electrode surface 4 or 4' which is practically devoid of barrier layer effect is reduced by only a small amount.

Figure 6:
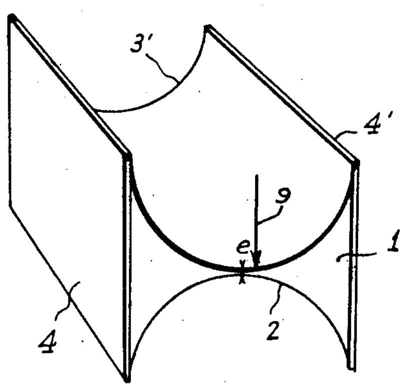
Figure 6 is a perspective view of another form of embodiment of the invention.
Figure 7:
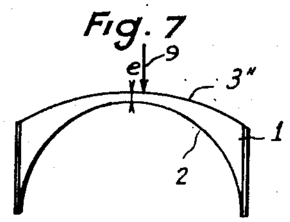
Figure 7 shows in transverse cross section, a further form of embodiment of the invention.

In the foregoing exemplary embodiments, it was assumed that the face 3 opposite from the concave face 2 was flat. However, should this be found more convenient in obtaining, by grinding, the desired thickness $e$, it is not essential that the face 3 be flat. In Figure 6, it is assumed that this face is also a concave surface 3', and in Figure 7 it is assumed that this face is an outwardly convex surface 3''. It is only necessary that the thickness $e$ of the crystal in its thinnest part have the desired thickness of from 1 to 500$\mu$.

What I claim is:

1. Semi-conducting device comprising an elongated solid semi-conductor having at least partially a surface of parallel generatrices and a cross-section perpendicular to said generatrices, including at least one concave portion which forms with an opposite portion of said cross-section, a contraction which gradually enlarges when proceeding from one side of the elongated body to the other; and at least two surface electrodes applied to said sides.

2. Device according to claim 1 wherein the rate of increase in the thickness of said cross-section away from said central portion towards each enlarged side thereof is more rapid as the distance from said central portion itself increases.

3. Device according to claim 1 wherein said central portion has a thickness in the range of from 1 to 500 microns at the thinnest, central, point thereof, and said thickness increasing to either end away from said central portion at a rate which increases as the distance from said central point increases, to define outwardly-flared enlarged end portions in said element.

4. Semi-conductor crystal element as in claim 1 wherein said surface electrodes provide substantially no barrier layer effect at their interfaces contacting the crystal.

5. Device according to claim 1 wherein said semi-conductor is in the form of an optically negative, cylindrical, lens.

6. Device according to claim 1 wherein said semi-conductor is in the form of a plano-concave, cylindrical lens.

7. Device according to claim 1 wherein said semi-conductor is in the form of a concavo-concave, cylindrical lens.

8. Device according to claim 1 wherein said semi-conductor is in the form of a convexo-concave, optically negative, cylindrical lens.

9. Device according to claim 1 wherein said semi-conductor is in the form of a plano-concavo cylindrical lens wherein the concave side is part-circumferential in cross-section.

10. Device according to claim 1 wherein said cross-section includes one flat side and an opposite side defined by a central concave part-circumference defining with said flat side a thinned-out concave central portion, and two convex part-circumferences each connecting one end of said central part-circumference with the corresponding end of said flat side and each intersecting at right angles both said central part-circumference and said flat side, and defining symmetrical enlarged convex side portions.

11. Device according to claim 1 wherein said cross-section includes one flat side and an opposite side defined by a concave part-circumference and two lines connecting the ends of said part-circumference with the corresponding ends of said flat side and normal thereto.

12. Device according to claim 1 wherein said cross-section includes one generally flat side and one generally concave side consisting of a central part-circumferential concavity defining with said generally flat side a thin central area, and enlarged outwardly flared end portions, and surface electrodes applied to said end portions over end areas thereof.

13. Device according to claim 1 wherein said cross-section includes one generally flat side and one generally concave side consisting of a central part-circumferential concavity defining with said generally flat side a thin central area, enlarged outwardly flared end portions, surface electrodes applied to end areas of said end portions, and at least one additional electrode making contact with said flat side in its thin central portion thereof over a total length $$1=2\sqrt{e(2r+e)}$$

wherein $e$ is the thickness of the element at its thinnest, central, point, and $r$ is the radius of said part-circumferential central concavity.

14. Semi-conductor device according to claim 1 wherein the surface facing the convex portion of said elongated semi-conductor is noticeably flattened in a direction which is oblique with respect to said generatrices, said generatrices being rectilinear.

15. Method of producing a semi-conducting device in the form of a cylinder having a generally flat and an opposite generally part-circumferentially concave side, which comprises molding said element in a mold containing a rod-like core complementarily corresponding to said part-circumferential concavity, withdrawing the molded element and mounting it with a supporting rod fitted in said concavity in place of said core, and grinding said generally flat side thereof to obtain an accurately predetermined thickness in said central area thereof.

HEINRICH WELKER.

References Cited in the file of this patent

UNITED STATES PATENTS

| Number | Name | Date |
|---|---|---|
| 1,226,471 | Coolidge | May 15, 1917 |
| 2,502,479 | Pearson et al. | Apr. 4, 1950 |
| 2,522,521 | Kock | Sept. 19, 1950 |
| 2,549,550 | Wallace | Apr. 17, 1951 |
| 2,597,028 | Pfann | May 20, 1952 |